United States Patent
Mattila (10) Patent No.: US 8,023,951 B2
(45) Date of Patent: Sep. 20, 2011

(54) DYNAMIC COVERAGE AND CAPACITY SOLUTION FOR CELLULAR RADIO NETWORK

(75) Inventor: Jyrki Mattila, Oulu (FI)

(73) Assignee: Nokia Siemens Networks Oy, Espoo (FI)

(*) Notice: Subject to any disclaimer, the term of this patent is extended or adjusted under 35 U.S.C. 154(b) by 0 days.

(21) Appl. No.: 10/699,689

(22) Filed: Nov. 4, 2003

(65) Prior Publication Data

US 2004/0214579 A1  Oct. 28, 2004

(30) Foreign Application Priority Data

Apr. 24, 2003 (GB) .................................. 0309323.4

(51) Int. Cl.
*H04W 36/00* (2009.01)
(52) U.S. Cl. ...... 455/444; 455/449; 455/446; 455/452.1
(58) Field of Classification Search .................. 455/509, 455/446–452.2, 444
See application file for complete search history.

(56) References Cited

U.S. PATENT DOCUMENTS

| | | | | |
|---|---|---|---|---|
| 5,448,751 A * | 9/1995 | Takenaka et al. | ............. | 455/450 |
| 5,758,090 A * | 5/1998 | Doner | ............. | 709/236 |
| 5,889,494 A * | 3/1999 | Reudink et al. | ............. | 342/373 |
| 5,960,352 A * | 9/1999 | Cherpantier | ............. | 455/451 |
| 6,128,328 A * | 10/2000 | Schilling | ............. | 375/134 |
| 6,324,403 B1* | 11/2001 | Jalloul | ............. | 455/453 |
| 6,370,383 B1* | 4/2002 | Leatham et al. | ............. | 455/446 |
| 6,584,084 B1* | 6/2003 | Barany et al. | ............. | 370/329 |
| 6,741,859 B2* | 5/2004 | Otsuka et al. | ............. | 455/438 |
| 6,950,678 B1* | 9/2005 | Mujtaba et al. | ............. | 455/562.1 |
| 2004/0203837 A1* | 10/2004 | Lawrence | ............. | 455/455 |
| 2004/0229622 A1* | 11/2004 | Choi et al. | ............. | 455/445 |

FOREIGN PATENT DOCUMENTS

| | | |
|---|---|---|
| EP | 0531090 | 3/1993 |
| WO | WO 96/37082 | 11/1996 |
| WO | WO 97/40594 | 10/1997 |

\* cited by examiner

*Primary Examiner* — Kamran Afshar
*Assistant Examiner* — Dung Lam
(74) *Attorney, Agent, or Firm* — Squire, Sanders & Dempsey (US) LLP (57) ABSTRACT

A cellular communication system is provided. According to one embodiment, the communication system includes at least one cell. The at least one cell is defined by a coverage layer defining a coverage of the at least one cell and a capacity layer at least partly defining a capacity of the at least one cell.

14 Claims, 10 Drawing Sheets

DYNAMIC COVERAGE AND CAPACITY SOLUTION FOR CELLULAR RADIO NETWORK

BACKGROUND OF THE INVENTION

1. Field of the Invention

The invention relates to cellular communication systems, and particularly to the optimization of radio coverage and capacity at a cell level. The invention is particularly but not exclusively concerned with time division multiple access (TDMA) systems.

2. Description of the Related Art

A typical cellular radio network may include of a system in which radio cells have both fixed coverage and fixed capacity performance, which can lead to extensive downlink capacity overhead and wasted resources. A time division multiple access (TDMA) system is an example of such a system.

Such systems are either multicarriers or single carrier systems. A multicarrier system includes a single transmission unit that can broadcast a plurality of carriers. A single carrier system includes a single transmission unit that can broadcast a single carrier. In such single carrier systems, in order to increase capacity, it is necessary to use multiple transmission units, and combine the multiple carrier signals to an antenna.

Typically, a multicarrier system has a certain maximum downlink transmit power that is divided between the carriers used in the cell. That is, the more carriers in use means that less downlink power is allocated to the carriers (users), leading to diminished coverage of the radio cell. In a single carrier system, the addition of new carriers (to increase capacity) leads to increased combining losses if the amount of antennas is not increased. Without proper control of these systems, capacity/coverage overhead exists, further leading to wasted resources. Network planning may also become a problem.

In general, existing GSM radio networks are planned so that the cell coverage is determined by the carrier for the broadcast control channel (BCCH). All other traffic carriers, if present, have the same coverage as the BCCH, with the same service. This kind of a system provides the same service for the same amount of users over the whole cell area, and does not take into account a user's location in the cell area. Typically this is a waste of resources.

A particular problem is related to the downlink in multicarrier systems. In a multicarrier system, the power that is allocated to the broadcast control channel determines the coverage of the entire cell, and the power which is 'left over' is used for other traffic carriers. If the output power of the system is 40W and the operator decides that the broadcast control channel is to be transmitted with 36W (i.e. 90% of the total power), then this leaves only 4W available for the remaining traffic channels. If, for example, there are four further traffic channels, then the use of such traffic channels with the available power is clearly inefficient, as such channels are effectively useless.

As such, there is a need for network operators to carefully plan network design in the case of multicarrier systems.

Two techniques have attempted to provide improved solutions in single carrier systems.

One such technique is a first single carrier system which is known as intelligent coverage enhancement (ICE). This is a technique where the same area or sector is covered by two cells with different output powers, and these two cells share common antennas. Because of the difference in the power between the two cells, the coverage areas are not entirely coincident. However it is characteristic of this arrangement that the coverage area of the cell having a smaller output power is totally within the coverage area of the cell having the higher output power. This allows the use of common antennas.

An enhanced arrangement known as ICE+ allows different kinds of configuration, including different numbers of transmitters and antennas. However for both ICE and ICE+ functionality the coverage and capacity of the cells is fixed by the base transceiver station hardware.

The other technique is a second single carrier system which is known as intelligent underlay/overlay (IUO). IUO is a feature designed to allow an operator to reuse frequencies more intensively, and hence achieve a higher radio network capacity. In order to achieve a higher radio network capacity by means of IUO, the operating spectrum of the network is divided into regular frequencies and super-reuse frequencies. Continuous coverage areas provided by the overlay network utilize irregular frequencies. The super-reuse frequencies are intended to serve mobile stations which are, for example, close to the base transceiver station.

However, in IUO the coverage and capacity is again fixed by the base transceiver station hardware.

SUMMARY OF THE INVENTION

In one embodiment, the invention provides a cellular communication system including at least one cell. The cell is defined by a coverage layer defining a coverage of the cell and a capacity layer at least partly defining a capacity of the cell.

In another embodiment of the invention, there is provided a method of configuring a cellular communication system. The method determines a coverage layer for a cell defining a coverage of the cell and determines a capacity layer for the cell at least partly defining a capacity of the cell.

In a further embodiment, the invention provides a base station of a mobile communication system. The base station includes a device for transmitting a carrier at a predetermined power level thereby defining a coverage area of a cell. The base station also includes a device for transmitting a variable number of carriers thereby defining, at least in part, a capacity of the cell.

BRIEF DESCRIPTION OF THE DRAWINGS

The invention is now described by way of example with reference to the accompanying drawings, in which.

DETAILED DESCRIPTION OF THE PREFERRED EMBODIMENTS

The invention is now described herein by way of reference to particular non-limiting examples. In particular, the invention is described by way of reference to a time division multiple access (TDMA) system, such as a global system for mobile communications (GSM).

Figure 1:
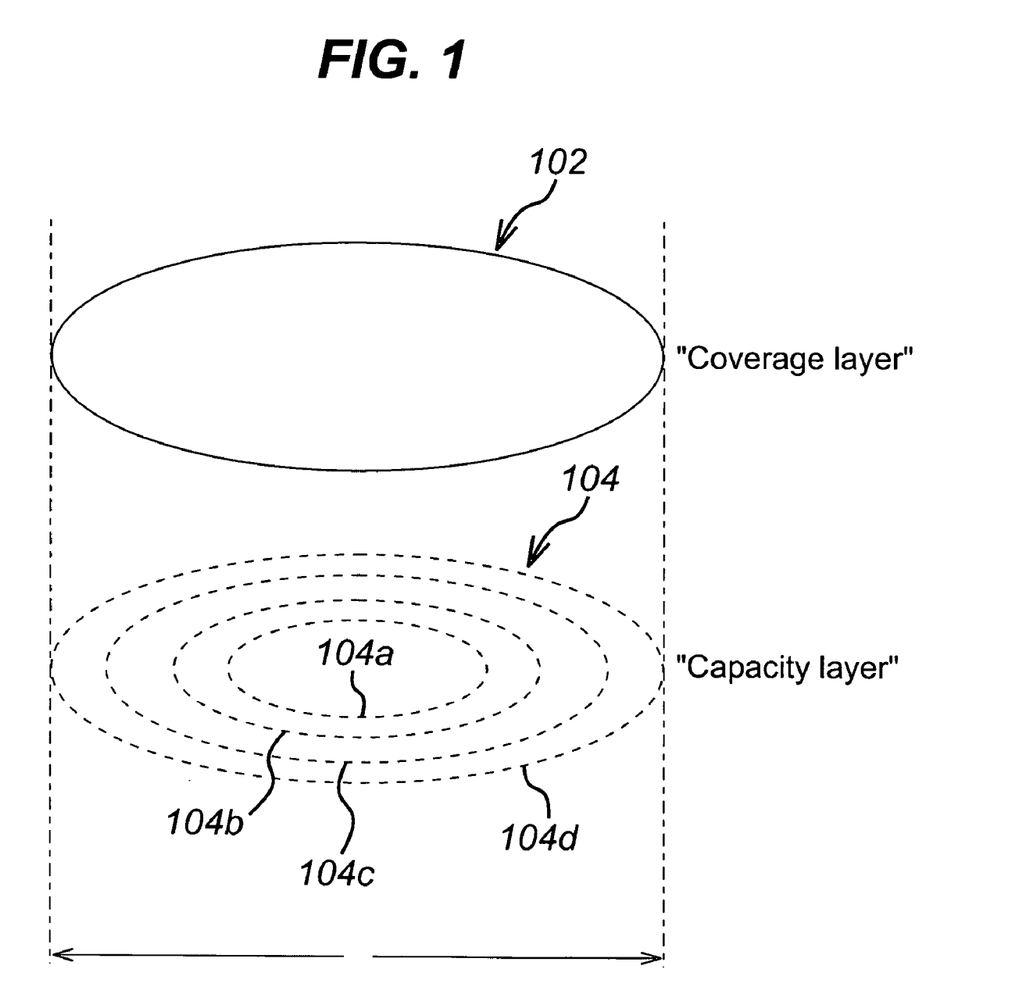
FIG. 1 illustrates the concept of a dynamic coverage and capacity system in accordance with an embodiment of the invention.

Referring to the example shown in FIG. 1, there is illustrated conceptually the principle of the invention as applied in embodiments of the invention. The technique of the invention may be referred to as a dynamic coverage and capacity solution (DCCS).

In accordance with the principles of this concept, for each cell there is defined two layers. The first layer 102, preferably referred to as a 'coverage layer', defines the maximum coverage area of the cell, and thus in effect defines the physical constraints of the cell. Any carrier signal transmitted in the coverage layer is transmitted at a power level such that the carrier can be received by a mobile station located anywhere in the-cell. The coverage layer is hence defined by the maximum power level for the cell, and for a carrier signal transmitted at the maximum power level represents the maximum physical size of the cell. In a GSM system, the broadcast control channel (BCCH) carrier is the minimum carrier including the coverage layer. The broadcast control channel must be transmitted over the entire cell, and thus the limitation of the broadcast control channel power dictates the physical limitation of the cell size. The coverage layer guarantees that any signal transmitted therein is received by any mobile station which is anywhere in the cell.

In this example, a second layer 104, termed a 'capacity layer', allows carriers to be added or removed from the cell, thereby varying the capacity of the cell. In particular, the capacity layer is associated with carriers in respect of which the power level may be varied, such that the range of such carriers may vary. That is, the power level of a carrier signal may vary in dependence upon the distance of an associated mobile station from the base transceiver station. If a mobile station is close to the base transceiver station, then a relatively low power is required to communicate with the mobile station. If the mobile station is closer to the edge of the cell, then a relatively high power is required to communicate with the mobile station. Thus the power associated with each individual carrier is varied preferably in dependence upon information relating to the position of the mobile station. This is represented in FIG. 1 by the dash lines 104a, 104b, 104c, representing the transmission extremities of three different carriers associated with three different power levels. The power associated with each of these dashed lines may, in total, correspond to the power associated with the single dash line 104d, which represents a carrier transmitted with sufficient power to cover the edges of the cell, i.e. a carrier transmitted with a power corresponding to the power level of carriers in the coverage layer 102.

In the embodiments of the invention, therefore, a proportion of the total available power in the transmitter is allocated to each of the coverage layer 102 and the capacity layer 104. In the capacity layer 104, the available power is shared amongst the available carriers. In this way, the power level of various carriers can be adjusted without adjusting the overall power level, to ensure communication with all mobile stations with which such carriers are associated.

Users, or mobile stations, may be moved between carriers in the capacity and coverage layers as their position changes or as system requirements change. For example, when a mobile station moves to the edge of the physical cell area, its connection may be moved from the capacity layer to the coverage layer (internal handover). The same may happen in reverse. In such handovers, the radio resource management (RRM) orders the mobile station to change carrier frequency and selects a certain time slot from the new carrier in the coverage or capacity layer.

Carriers, which can be considered as one frequency in a frequency band, may also be moved between the capacity layer and the coverage layer depending upon the system requirements. However if a carrier is moved between the capacity and coverage layers, the parameters of the cell are changed, as will become apparent from the following description, particularly in relation to Tables 1 and 2 below. The process is 'heavier' than simply moving a connection. When a carrier is moved between layers the RRM must also take into account any effect on surrounding cells.

As such, the 'coverage layer' and 'capacity layer' may be utilized in order to dynamically control the coverage and capacity of carriers. The coverage of certain carriers may be limited, in order to accommodate more carriers in the network. A further understanding of the principles of the invention, and how the same may be carried into effect, can be understood from the below described examples. The invention is described further hereinbelow in relation to two main examples: an example of a multicarrier system and an example of a single carrier system.

Multicarrier systems and single carrier systems are referred to in the above discussion. A basic multicarrier system uses only one antenna for downlink transmission. Several carriers are produced by a single unit, which is connected to the one antenna. In the single carrier system only one carrier is produced by a single unit. Thus, if several carriers are needed they must be combined to one antenna, or to two antennas as required for a DCCS system, or each carrier may have its own antenna in the downlink.

Multicarrier System

In multicarrier systems the radio cell is given a 'pole' coverage and a 'pole' capacity depending on the performance of the base transceiver station (BTS) system. The pole coverage is defined to be the maximum coverage of the cell for a single carrier; i.e. the area coverage when the whole transmit power is used for one carrier. The pole capacity is defined to be the maximum number of carriers that can be configured to a given cell using multicarrier technology. The pole coverage and pole capacity in the cell cannot be reached simultaneously as they represent opposite, or polar, conditions. However the radio resource management of the network has the capability to dynamically adjust the coverage and capacity of the cell between the pole values.

The pole values are referred to herein as part of a set of Coverage and Capacity Ratio (CCR) parameters. The CCR parameters include a predefined power ratio (a power ratio between the coverage and capacity layers) and a predefined capacity ratio (a carrier ratio between the coverage and capacity layers). The CCR parameters can be easily mapped to a table which can be utilized dynamically for the network (radio cells). The table can be used in the network management.

Table 1 gives an example of a CCR parameters table with a relative coverage (pole coverage=1) and 8-carrier pole capacity without an antenna combining system. As an antenna combining system is not used, then each carrier is associated with a respective antenna. If an antenna combining system is used the CCR parameters may have different values than those illustrated in the example of Table 1.

The first column of Table 1 lists the number, or identity, of the CCR parameters. The second column lists the power of the BCCH carrier relative to the other carriers in the cell. The third column lists the total capacity, i.e. the total number of carriers in the cell. In the example shown in Table 1, the number of carriers is the BCCH carrier plus any traffic carriers. The fourth column lists the relative power of the traffic carrier(s) in the capacity layer to the traffic carrier(s) in the coverage layer. The fifth and sixth columns respectively list the capacity ratio and the power ratio.

In the example shown in Table 1, a set of eight CCR parameters is defined. The two pole cases (CCR 1 for the pole coverage and CCR 8 for the pole capacity) are discussed below.

For CCR 1, it is shown in Table 1 that the total number of carriers is one. This carrier is the BCCH carrier in the coverage layer. As such the capacity ratio is 1:0, and the power ratio is 1:0. The whole transmit power is used for a singe carrier in this case, and this represents the pole coverage.

For CCR 8, in Table 1, the total number of carriers is eight. This is the BCCH carrier and seven traffic carriers. All traffic channels are allocated to the capacity layer, and as such the capacity ratio is 1:7. This represents the pole capacity where the system accommodates a maximum of eight carriers. Given that one of the carriers (the BCCH carrier) must be allocated to the coverage layer. The maximum number of carriers that may be allocated to the capacity layer is seven.

The CCR parameters table may be predefined and may be used by the radio resource management in network planning. Eight sets of parameters are shown in Table 1 by way of example. The table may, however, include a larger set of parameters.

Carrier(s) for which the coverage area is fixed and which have the widest coverage (i.e. the BCCH in the described example) form the coverage layer for the radio cell. Carriers for which the coverage area can be changed, and which may be added or removed to vary capacity (i.e. traffic carriers) form the capacity layer for the radio cell. The invention allocates the available BTS transmit power between the coverage layer and the capacity layer in such a way that the performance of the cell/network is optimized. Any single carrier in the capacity layer in one embodiment may not have a wider coverage (more power) than the coverage layer. However, it is nevertheless possible to allocate more power to certain users (radio time slots) or carriers in the capacity layer so that they can reach coverage of the coverage layer extremes, or have a better quality of service (e.g. data throughput), if needed. This feature ensures that users in the capacity layer can be served over the whole cell area provided that the total power allocated to the capacity layer is not exceeded. When the power of the capacity layer starts to reach its maximum value (e.g. 90%) some users are preferably dynamically moved to the coverage layer. The coverage layer provides a basic and fixed coverage and capacity over the whole cell.

The coverage of the capacity layer is a parameter that effects the network performance and planning in terms of maximum available traffic carriers. It is preferable to define a minimum available transmit power for the traffic carrier(s), which is then used to guarantee that all user connections in the capacity layer have a certain performance (coverage and Quality of Service). The minimum available carrier transmit power then sets a lower limit to the coverage of the capacity layer.

TABLE 1

| CCR | Relative power of the BCCH carrier | Total capacity (no of carriers; BCCH + traffic carriers) | Relative power of the traffic carrier (capacity layer) | Capacity ratio | Power ratio |
|---|---|---|---|---|---|
| 1 | 1 | 1 | N/A | 1:0 | 1:0, Pole coverage |
| 2 | 0.5 | 2 | N/A | 2:0 | 1:0 |
| 3 | 0.5 | 3 | 0.25 | 1:2 | 1:1 |
| 4 | 0.5 | 4 | 0.1666 | 1:3 | 1:1 |
| 5 | 0.5 | 5 | 0.125 | 1:4 | 1:1 |
| 6 | 0.25 | 4 | 0.25 | 1:3 | 1:3 |
| 7 | 0.25 | 6 | 0.15 | 1:5 | 1:3 |
| 8 | 0.25 | 8 | 0.11 | 1:7, Pole capacity | 1:3 |

It should be noted that Table 1 is a representation of an example, and appropriate tables will vary according to implementation scenarios. Table 1 (like Table 2 below) provides examples for only an 8-carrier system, which may represent the most useful combinations for such a system. If there is provided a unit that can produce only 4 carriers then the parameters from CCR1 to CCR4 can be used. If there is provided a unit that can produce 12 carriers then more CCR parameters should be defined. Tables 1 and 2 provide examples which aid in illustrating what kinds of carrier combinations are possible and can be utilized by the radio resource management of the system.

If required, the coverage layer may be allocated more than one carrier. Furthermore, the capacity layer may be further divided into sub-layers. This type of network topology is exemplified by Table 2.

TABLE 2

| CCR | Relative power of the coverage carriers | Total capacity (no of carriers; BCCH + traffic carriers) | Relative power of the traffic carriers in the capacity layer 1 | Relative power of the traffic carriers in the capacity layer 2 | Capacity ratio | Power ratio |
|---|---|---|---|---|---|---|
| 9 | 0.4 | 3 | 0.2 | N/A | 2:1 | 1:0.25 |
| 10 | 0.4 | 4 | 0.1 | N/A | 2:2 | 1:0.25 |
| 11 | 0.5 | 3 | 0.3 | 0.2 | 1:1:1 | 1:0.6:0.4 |
| 12 | 0.5 | 4 | 0.25 | 0.125 | 1:1:2 | 1:0.5:0.5 |
| 13 | 0.5 | 5 | 0.15 | 0.1 | 1:2:2 | 1:0.6:0.4 |
| 14 | 0.25 | 8 | 0.125 | 0.1 | 1:2:5 Pole capacity | 1:1:2 |

The radio resource management defines useful CCR parameters for different radio cells, on an implementation specific basis. Each cell in a network may have a unique CCR parameter table, or CCR parameter tables may be shared between two or more cells. The CCR parameters may be used to effectively change the capacity of a cell, and to move the capacity between cells if the operator's frequency band does not otherwise allow additional carriers to be taken into use. This is illustrated with reference to a practical implementation described with regard to FIGS. 7 to 10 below.

Figure 9:
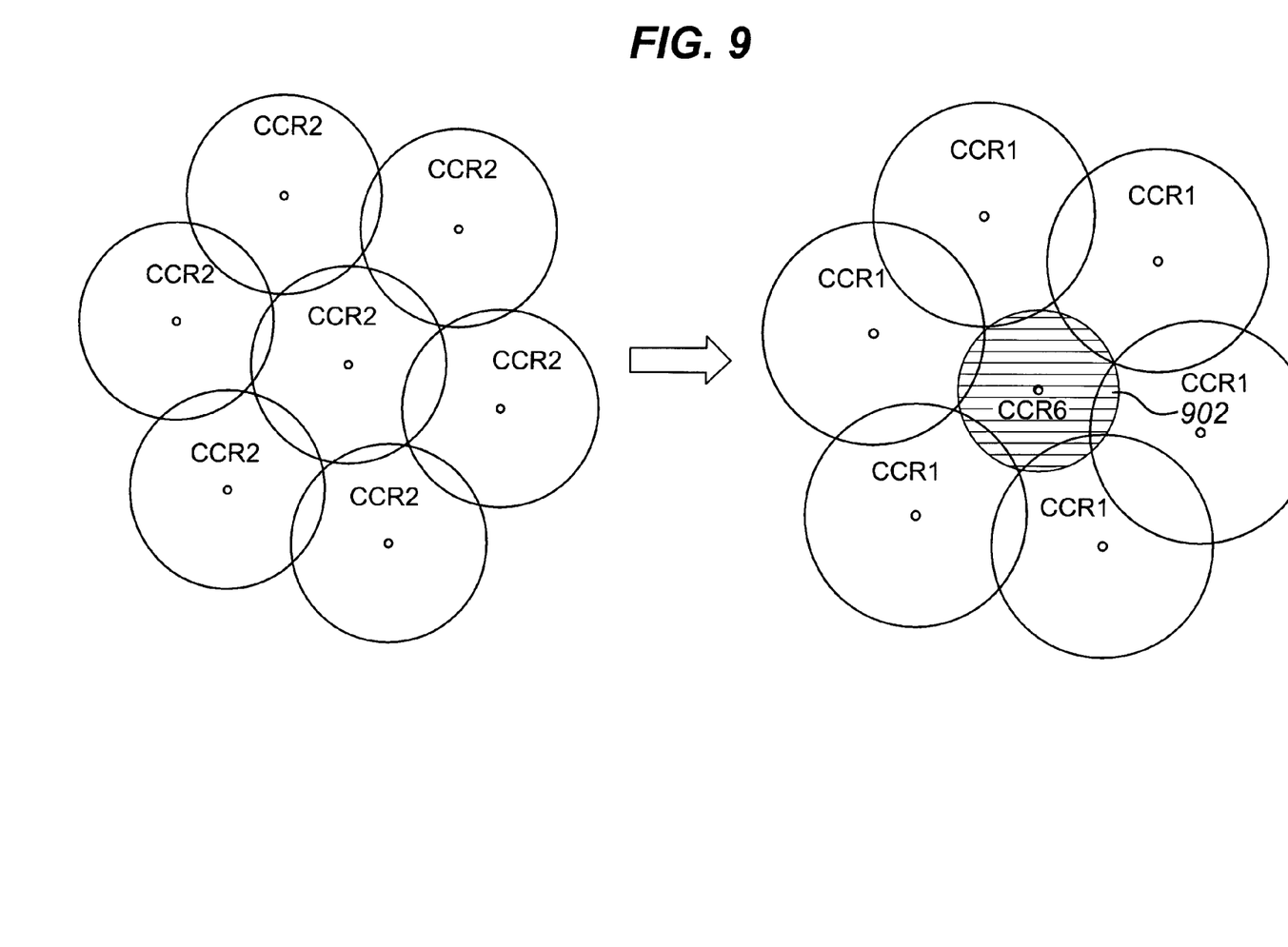
Figure 10:
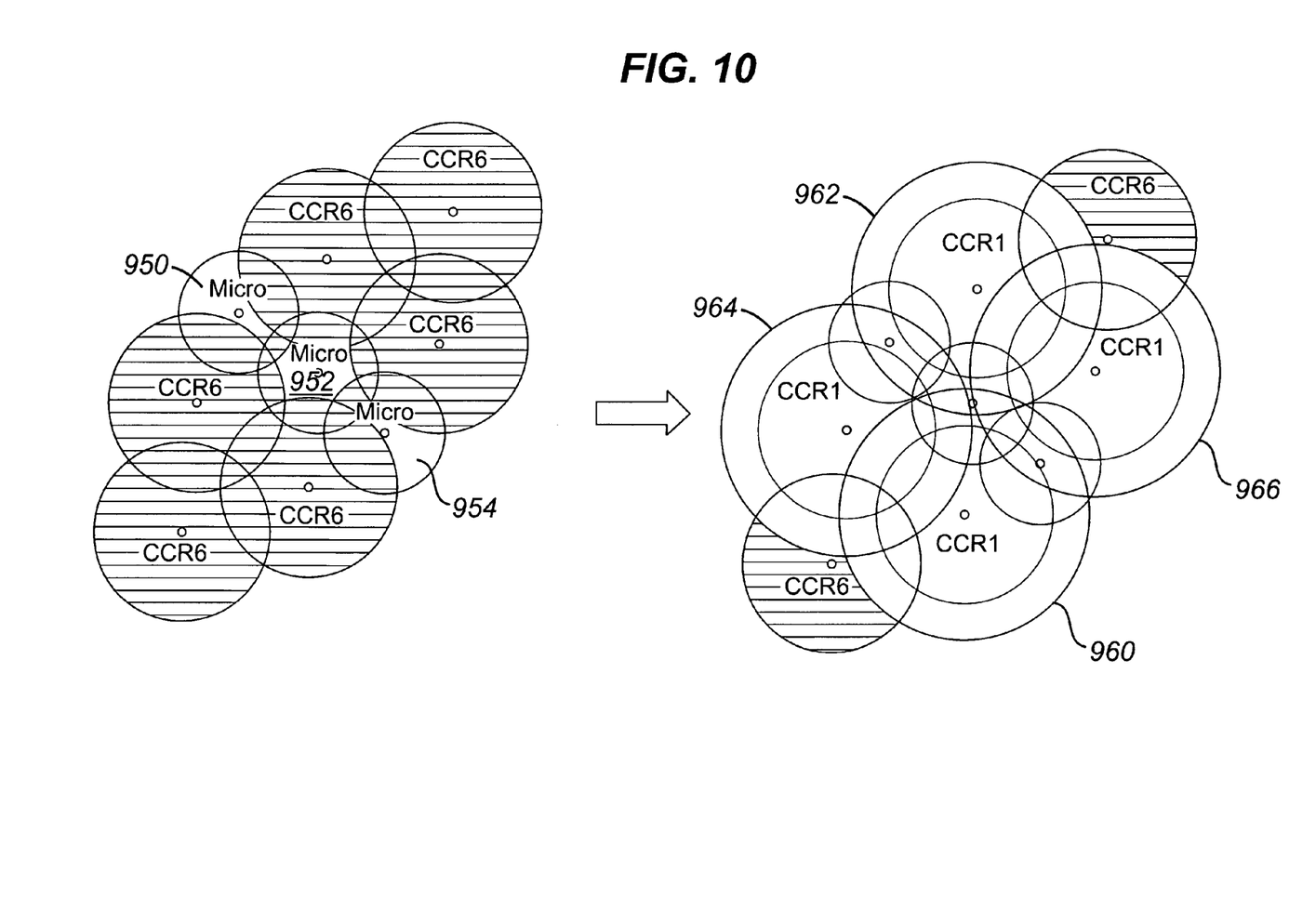

The radio resource management can dynamically change the CCR parameters of a cell taking into account any effect on adjacent cells. This leads to a system where certain CCR parameters work effectively in pairs. FIGS. 9 and 10, described in further detail below, show cellular systems which use parameter sets CCR 1 and 6 of Table 1 effectively, for example.

By way of illustration, it may be advantageous to change the CCR parameter settings in the following example scenarios:

The capacity of a cell is exceeded temporarily.

More capacity is needed for a certain area during busy hours.

Extension of the coverage of a cell during a lazy time (i.e. when there is a low number of users).

The capacity needs may vary greatly, for example, in events and places such as: holiday resort, exhibitions, shopping malls, sport events, office areas etc.

Figure 2:
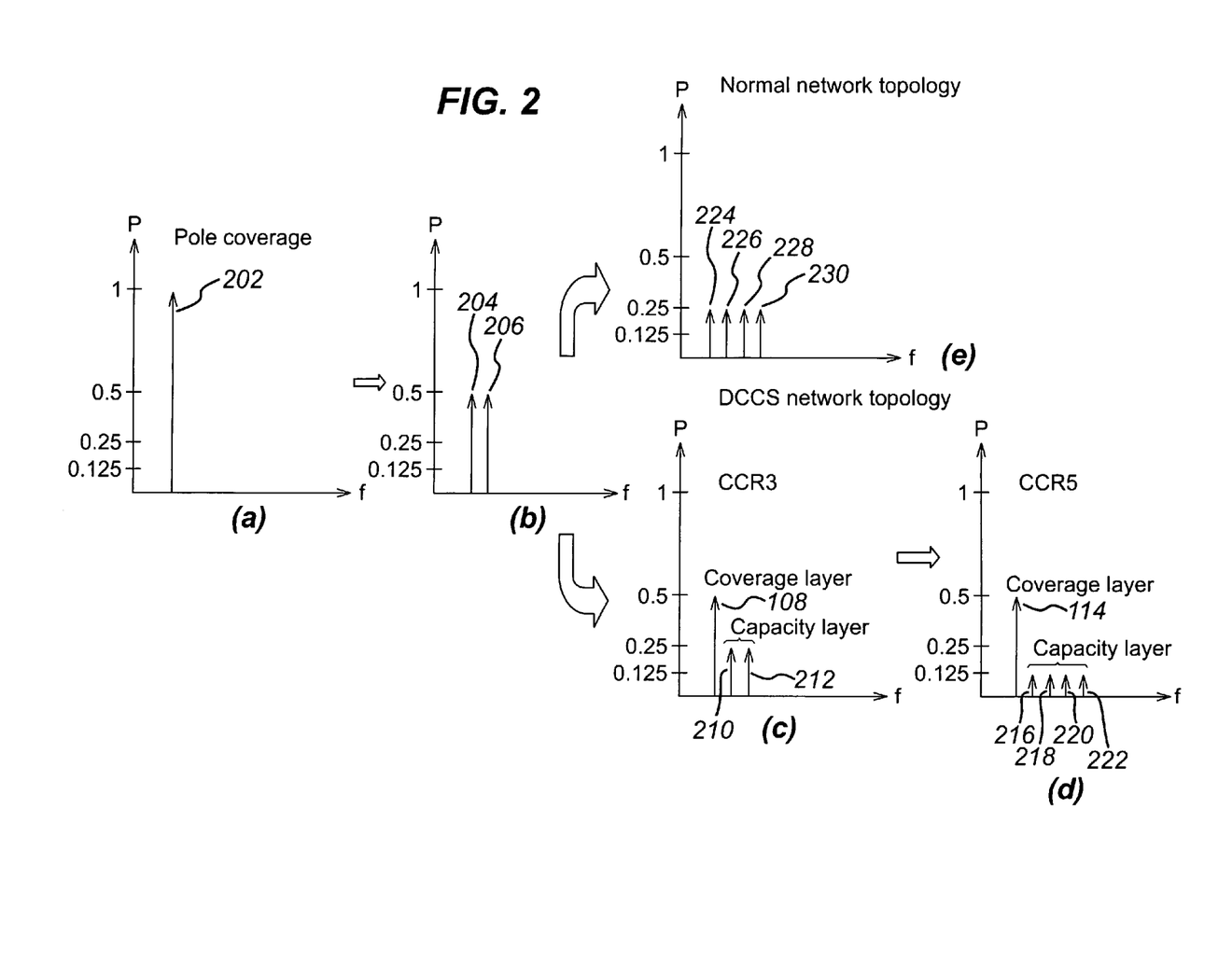
FIG. 2 illustrates graphs representing an example embodiment of a multicarrier system.

The example shown in FIG. 2 shows the difference in downlink power dimensioning between a conventional radio cell and a DCCS radio cell in accordance with an embodiment of the invention in a multicarrier system.

Some of the shortcomings associated with a linear power amplifier (LPA) designed for a multicarrier system transmitter may benefit significantly from the invention. An example of such a shortcoming is that the LPA may be a very expensive device since it has to be very powerful to meet high coverage and capacity demands simultaneously. Since the LPA may be a large device, another shortcoming associated with the LPA may be its size. Sinceee the LPA also has to produce a lot of heat due to relatively low efficiency (20%), this heat production is another shortcoming of the LPA. These shortcomings, in turn, may limit the number of LPAs that can be installed in a BTS cabinet.

FIGS. 2a-2e illustrate examples of plots of power against frequency for a number of described scenarios. FIG. 2a illustrates a plot of power against frequency for the pole coverage scenario. As shown, there is represented a single carrier component 202 having a power level of unity (1).

FIG. 2b illustrates the representation in a system where half of the pole coverage must be met by all carriers. In such case, only two carriers 204 and 206 may be supported by the system.

FIG. 2c illustrates the system implementation for the CCR parameters CCR3 of Table 1 above. In the coverage layer there is provided a single carrier 108, and in the capacity layer there is provided a carrier 210 and a carrier 212. The carrier 108 takes half the total power, and the carriers 210 and 212 each take a quarter.

FIG. 2d illustrates the scenario for the case of the CCR parameter CCR5 from Table 1 above. In the coverage layer there is provided a single carrier 114, while in the capacity layer, there is provided four carriers 216, 218, 220 and 222. The carrier 108 takes half the total power, and the carriers 216 to 222 each take an eighth.

FIG. 2e represents the scenario in a conventional network arrangement where there is a requirement to support four carriers. Four carriers 224, 226, 228 and 230 are shown in FIG. 2e. Each of the carriers has a maximum power of a quarter of the total power. No variance is possible. The power is shared equally.

In practice a conventional system provides, for example see FIG. 2b, only a two carrier capacity if a half (0.5) of the pole coverage has to be met by one carrier (the broadcast channel). In comparson the invention using CCR 5 enables the provision of a capacity of 5 carriers (i.e. 150% more capacity). Thus in an embodiment of the invention, 150% less transmit power is needed for the same capacity as in the conventional system.

If the LPA maximum output power is 50 W in an antenna connector and the power is evenly allocated between the coverage and capacity layers then, for example, and referring to Table 1, CCR3 gives 25 W to the coverage carrier and 12.5 W (3 dB less) to each capacity carrier (FIG. 2c). Similarly referring to Table 1, CCR5 gives 6.3 W (i.e. 6 dB less than the coverage carrier) to capacity carriers (FIG. 2d). In theory 6 dB less power is equivalent to halving the cell range, but in practice the cell range reduces only about 25-35% depending on the environment. Accordingly a 3 dB reduction in power corresponds to 15-20% reduction in the cell range. A 30% reduction in the cell range corresponds to about a 50% (0.7*0.7=0.49) reduction in the serving area of the cell, and a 20% reduction in the cell range corresponds to about 36% (0.8*0.8=0.64) reduction in the serving area of the cell.

FIGS. 3a and 3b illustrate examples of plots of power against frequency corresponding to CCR parameters CCR5 of Table 1 above. FIG. 3c represents the theoretical implementation of the CCR parameter conditions CCR5.

Figure 3:
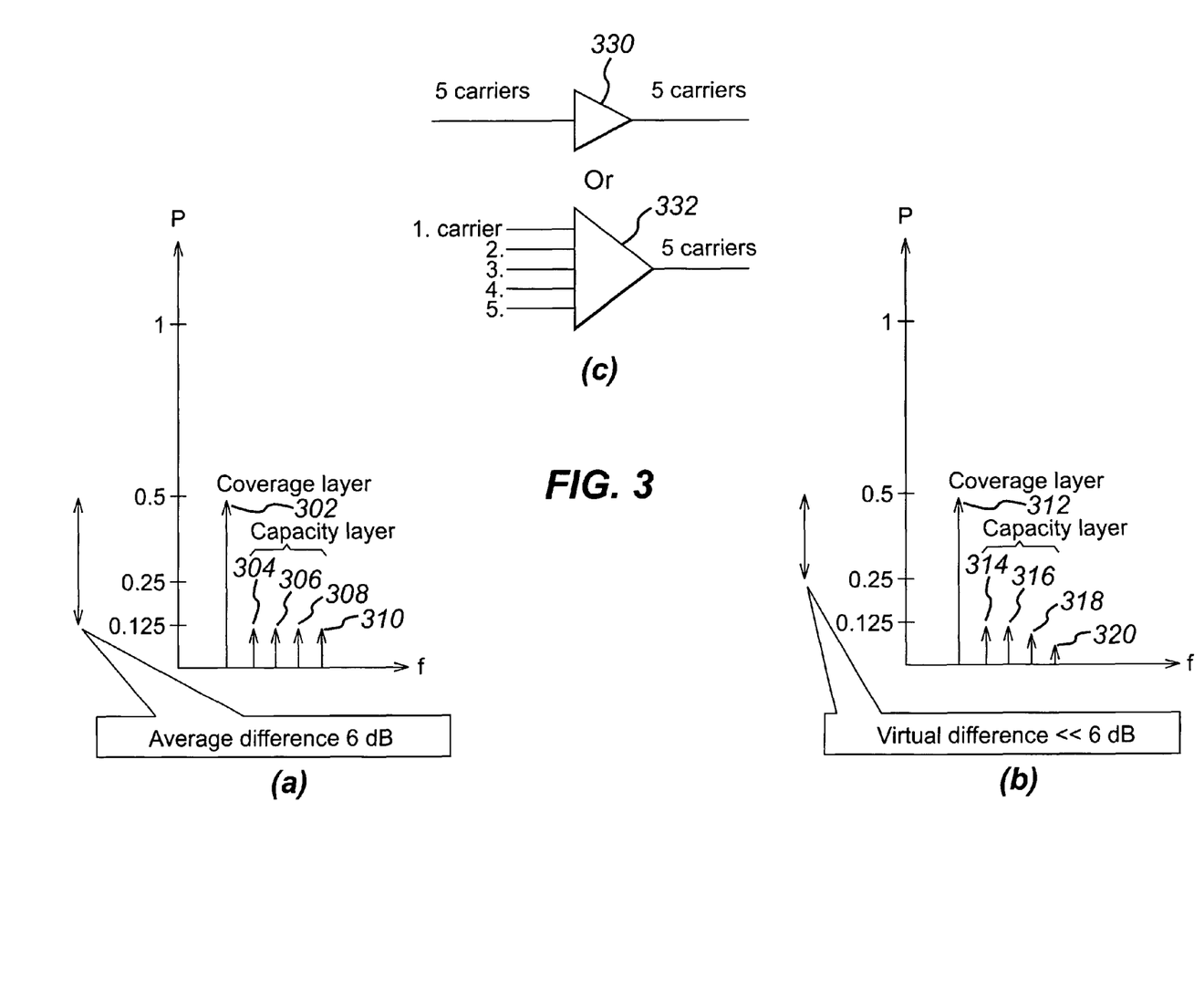
FIG. 3 illustrates graphs representing a further example embodiment of a multicarrier system.

In the example of FIG. 3, the coverage layer has a single carrier 302, and the capacity layer has four carriers 304, 306, 308 and 310. Each carrier has a power level of 0.125, as represented by FIG. 3a. FIG. 3b illustrates the practical result of such an implementation. Again the coverage layer has a single carrier 312 having a power level of 0.5. The capacity layer has four carriers 314, 316, 318, 320. As can be seen, the power level reduction for each of the carriers in the capacity layer may vary according to the appropriate carrier range.

Referring to FIG. 3c, there is illustrated an example implementation of a low power amplifier in the transceiver. A low power amplifier 330 may receive five carriers on a single input line and output the amplifier signals on a single output line. Alternatively a low power amplifier 332 may receive five carriers in parallel at its input, and output five carriers on its single output line. The power amplifiers 330, 332 thus show examples of two different ways to implement a multicarrier system.

In this embodiment, FIG. 3b illustrates that the capacity layer's carriers, such as carrier 314, may utilize the power in the capacity layer such that some mobile stations can reach the edge of the cell without having to change connections to the coverage layer. FIG. 3b illustrates that the 6 dB difference between the carriers in the layers (0.5/0.125) is actually the difference on average. Thus certain carriers in the capacity layer may use more than one eight of the power available (e.g. carrier 314) while others may use less power (e.g. carriers 318, 320). The power allocation between the carriers in the capacity layer may vary in accordance with the current location of a mobile with which the carrier is associated.

In implementing the embodiments of the invention, one factor which may be considered is how the performance difference between the layers can be decreased without excessively compromising the coverage and capacity of the radio cell.

Intrinsically, the multicarrier system can dynamically change the number of carriers and thus dynamically allocate the power between the carriers and the layers. This feature can be used in the capacity layer for coverage enhancement or QoS enhancement for some of the users as long as the available power resources (power, processing power, carrier numbers) are not exceeded. So, with CCR5 from Table 1 for example, the 6 dB difference in the performance of the layers is an average value and the virtual difference may be less, as shown in FIG. 3b.

An embodiment of the invention has been described by way of reference to an example application to a multicarrier environment. The invention may be also applied in a single carrier environment, and an example embodiment in a single carrier environment is described below.

Single Carrier System

In a single carrier system, multiple carriers are combined for a single antenna by using antenna combining units. Where new antennas are not added, the addition of new carriers increases the downlink combining loss. In a conventional system adapted to divide the radio cell into two layers (such as ICE or IUO), there is typically a permanent performance (coverage and capacity) difference between the layers.

This embodiment of the invention allows different types of combining systems and enhancement features to be utilized in the carriers of the layers. The utilized enhancement methods of the invention provide necessary dynamics for the system reducing the performance difference of the layers, similar to the multicarrier system described above.

Table 3 shows an example of the Coverage and Capacity Ratio (CCR) parameter table, a single carrier system incorporating Dynamic Downlink Diversity (DDD) and/or Dynamic Power Combining (DPC) techniques, in accordance with embodiments of the invention, for eight single carrier branches, which are combined in two transmit antennas. In this example, the relative power of the single transmitter branch is 1. However, the pole coverage can be greater than 1 due to enhancement features. The number of carriers combined in antennas, which are serving the cell, determines the pole capacity.

The system enhancements to allow a pole coverage of greater than 1 are further described by way of example. Consider a simple system of two power amplifiers. In a single carrier system these two amplifiers may be used to transmit a different signal each, or each amplifier may transmit the same signal (carrier/frequency). In this example, the power of the power amplifier is 1. If the same signal (frequency, carrier) is sent through two power amplifiers then the total power is 2×1=2 for that signal, and in this case the system can produce only one carrier. If there are two downlink antennas available this same signal can be sent through both without doing any precombining. The pole coverage is now 2 because the signal has a coverage which is 3-dB wider than the signal that is sent by a single amplifier and antenna. This is called downlink diversity transmission, which is a well-known technique.

If there is only one downlink antenna available the two signals, being the two same signal may be precombined by using a DPC (downlink power combining) technique, which again provides the coverage gain of 3 dB compared to the single amplifier system. The power combining is also a well-known technique.

The pole coverage can thus go as high as there are power amplifiers in the system, if the number of antenna is the same as the amount of power amplifiers. Namely, in an 8-amplifier system, the pole coverage can be 8 if all amplifiers have their own antenna (8). However, the practical implementation of these 'higher order' systems may not be feasible in some network systems.

As with Table 1 above, the first column of the example in Table 3 lists the number of the CCR parameters. The second column lists the power of the BCCH carrier relative to the other carriers in the cell. The third column lists the total capacity, i.e. the total number of carriers in the cell. In this example, the number of carriers is the BCCH carrier plus any traffic carriers. The fourth column lists the relative power of the traffic carrier(s) in the capacity layer to the traffic carrier(s) in the coverage layer. The fifth and sixth columns respectively list the capacity ratio and the power ratio.

Referring to Table 3, it can be seen that there is again defined a set of eight CCR parameters.

A practical implementation of DDD and DPC techniques of the embodiments of the invention for single carrier systems is described further below.

TABLE 3

| CCR | Relative power of the BCCH carrier | Total capacity (no of carriers; BCCH + traffic carriers) | Relative power of the traffic carrier (capacity layer) | Capacity ratio | Power ratio |
|---|---|---|---|---|---|
| 1 | 2 | 2 | 2 | 1:1 | 2:2, Pole coverage |
| 2 | 2 | 3 | 1 | 1:2 | 2:1 |
| 3 | 2 | 5 | 0.25 | 1:4 | 2:0.25 |
| 4 | 1 | 4 | 1 | 1:3 | 1:1 |
| 5 | 1 | 7 | 0.25 | 1:6 | 1:0.25 |
| 6 | 0.5 | 4 | 0.5 | 1:3 | 0.5:0.5 |
| 7 | 0.5 | 7 | 0.25 | 1:6 | 0.5:0.25 |
| 8 | 0.25 | 8 | 0.25 | 1:7 Pole capacity | 0.25:0.25 |

The DDD and/or DPC methods can be used separately in the invention for each user connection (i.e. carrier) in the capacity layer if the coverage for that carrier or its QoS needs improving. One feature of the embodiments of the invention in the single carrier implementation may be to allocate the available radio time slots between the users in the capacity layer in such a way that the performance of the cell/network is optimized. Thus, the performance difference of the coverage and capacity layers is reduced significantly.

A drawback in the single carrier embodiment is that the connections, which are using DDD and/or DPC techniques, reduce the number of the available radio time slots (i.e. the capacity) of the capacity layer.

In the multicarrier system described above, increasing the transmit power for some users reduces the available transmit power for others, i.e. the available transmit power is just divided differently between the users, but the capacity is not lost.

However, the performance enhancing features ensure that users in the capacity layer can be served over the whole cell area provided that the total capacity allocated to the capacity layer is not exceeded. When the capacity of the capacity layer starts to reach its maximum value (e.g. 90%) some DDD and/or DPC users may be moved to the coverage layer. The coverage layer provides a basic and fixed coverage and capacity over the whole cell.

As in the multicarrier system, the radio resource management defines useful CCR parameters for different radio cells. Again, the CCR parameters can be used effectively to change the capacity of the cell, and to move the capacity between the cells if an operator's frequency band does not otherwise allow additional carriers to be taken into use. The radio resource management can dynamically change the CCR parameters of the cell taking into account any effect on adjacent cells.

The single carrier system is more challenging for a DCCS implementation because the number of carriers and power are typically fixed in single carrier (SC) technology. Furthermore, compared to the multicarrier system, in single carrier systems, the CCR parameters have slightly different values because every carrier has its own power amplifier. That is, adding more carriers increases available power, but combining losses also have to be taken into account if the number of antennas is not increased. There are some techniques which can provide reasonable dynamic properties for the single carrier system.

A Dynamic Downlink Diversity (DDD) system and a Dynamic Power Combining (DPC) system implementation of a single carrier system in accordance with the invention are described below.

Figure 4:
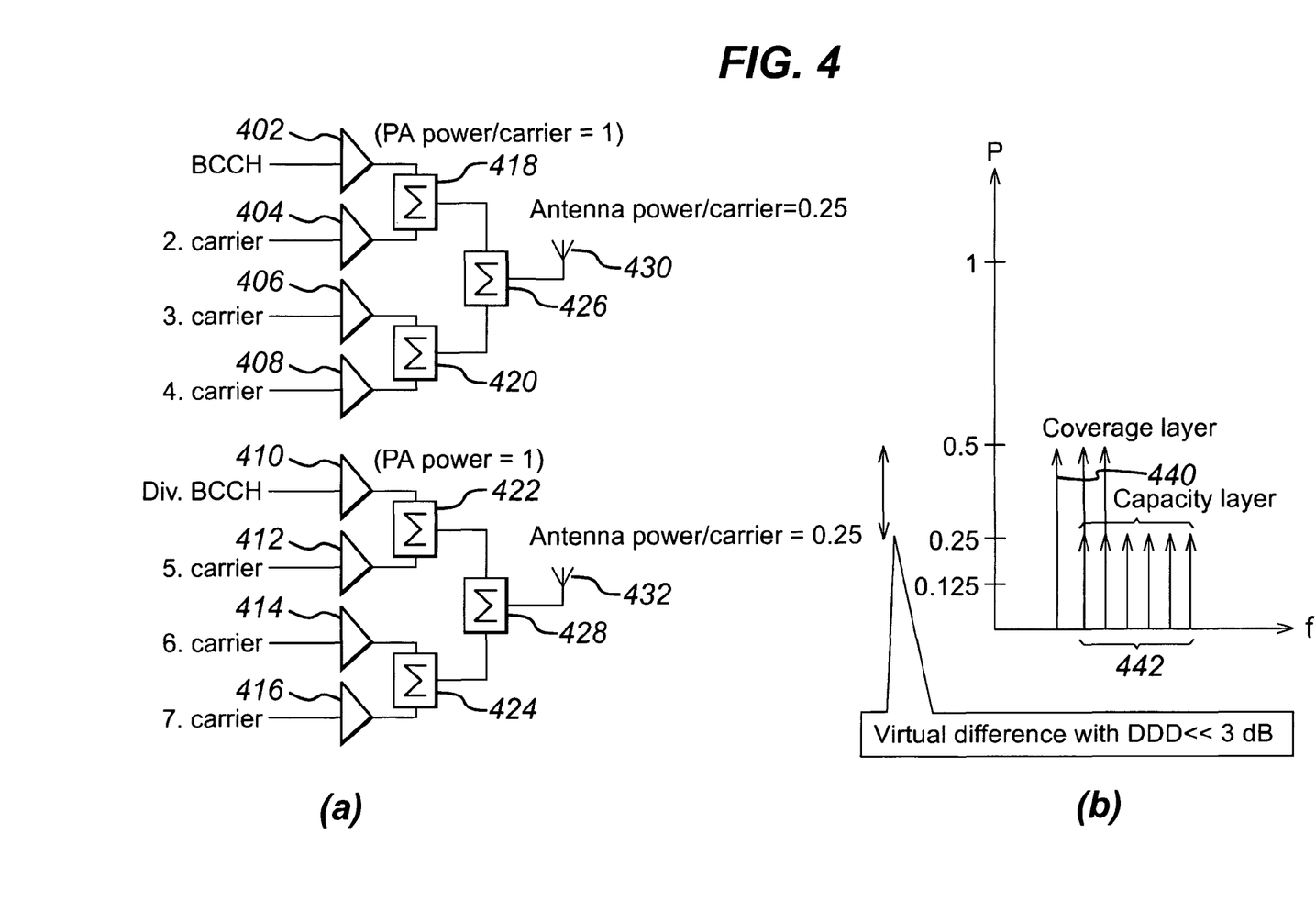
FIG. 4 illustrates an example implementation of power amplifiers in a single carrier system, and a graphical representation of the carrier signals.

An example of a DDD system in accordance with an embodiment of the invention is shown in FIG. 4. In this example, FIG. 4a illustrates an implementation of a transmitter in a single carrier system implementing dynamic downlink diversity. A first set of power amplifiers 402, 404, 406, 408 receive, respectively, the broadcast control channel carrier, and three traffic channel carriers. The summer 418 sums the outputs of the amplifiers 402, 404 and a summer 420 sums the outputs of the amplifiers 406, 408. The summer 426 adds the output of the summers 418 and 420 and drives a first antenna 430. A second set of amplifiers 410, 412, 414, 416 receive, respectively, the broadcast control channel carrier and three traffic channel carriers. The summer 422 sums the output of the amplifiers 410 and 412, and the summer 424 sums the output of the amplifiers 414 and 416. The summer 428 sums the outputs of the summers 422 and 424 and drives a second antenna 432.

In the example shown in FIG. 4(b) The coverage layer is enhanced using a downlink diversity transmission for the BCCH carrier (power 0.25+0.25=0.5). The capacity layer (6 carriers) may also utilize DDD. That is, if a speech user needs more power than what is available in the capacity layer, the radio resource management reserves another suitable radio time slot (RTS) for additional power. The radio resource management may request that the BTS perform a diversity transmission. The reserved RTSs (the same signal) may be allocated so that they are sent through two different antennas at the same time and frequency (DL delay diversity) giving the same performance as in the coverage layer. Accordingly, the RRM can reserve also more RTSs for a connection, which is using a data session (GPRS, HSCSD etc). Thus dynamic downlink diversity is utilized in the capacity layer and/or the coverage layer.

FIG. 4b illustrates an example of a graphical plot of power against frequency for this scenario. The coverage layer is associated with the single carrier 440 having a power level of 0.5, through diversity transmissions in two antennas. The capacity layer is associated with six traffic carriers having power levels of 0.25. However using diversity techniques, ones of the traffic carriers in the capacity layer may utilize diversity techniques to achieve the same power as in the coverage layer, through diversity transmission in two antennas.

In this example the minimum capacity is 4 carriers (including BCCH), and the maximum coverage may be achieved when all connections use DDD (CCR6, table 3). Furthermore, in this example, the maximum capacity (including BCCH) is 7 carriers when only the BCCH carrier uses DDD (CCR7). The relative coverage is 0.5.

It will be apparent to one skilled in the art how different variations and power control may be achieved if more than two antennas are provided. The use of the DDD techniques allows power control to be achieved even within the 'fixed' power structure of a single carrier system.

Figure 5:
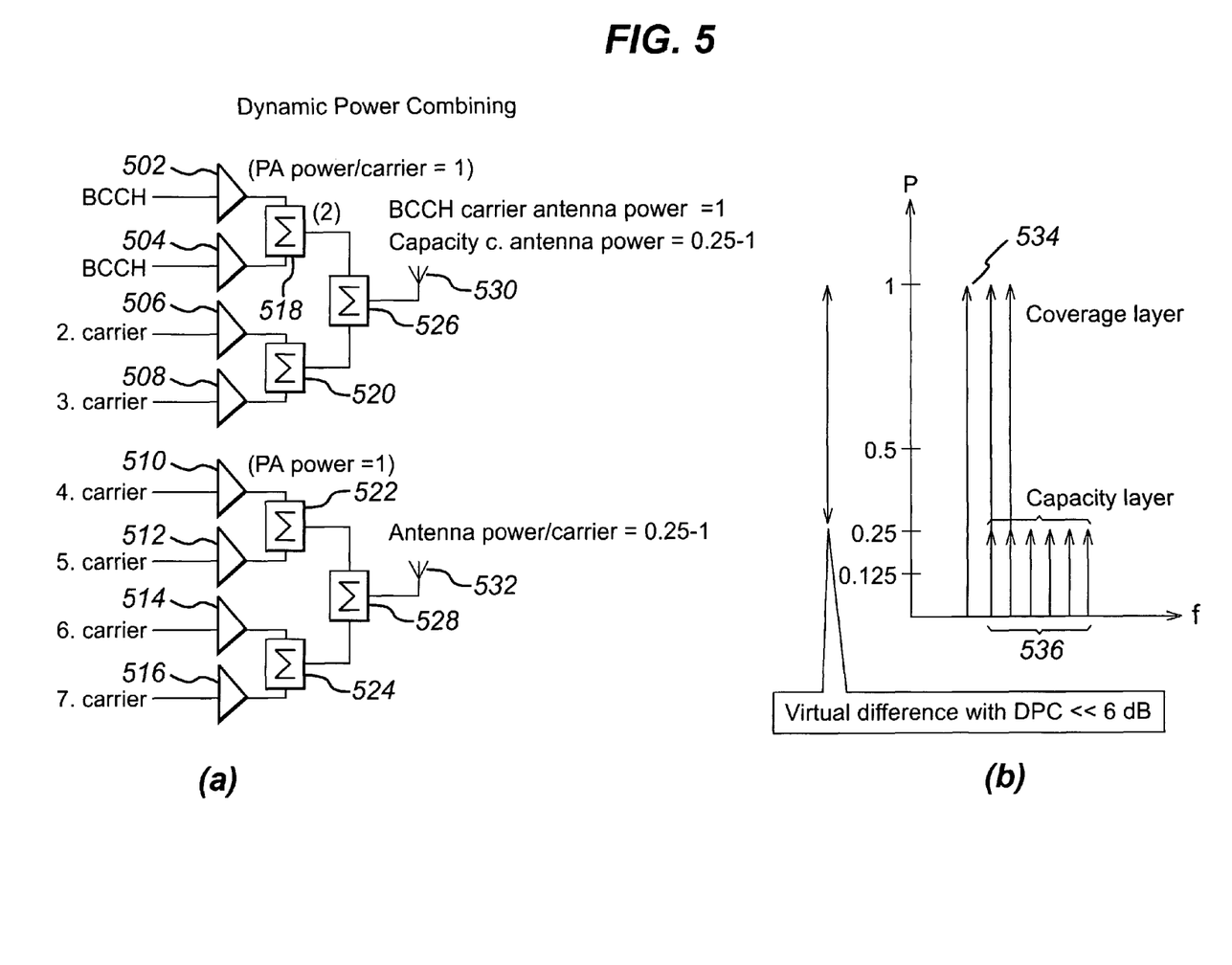
FIG. 5 illustrates an example implementation of power amplifiers in a single carrier system, and a graphical representation of the carrier signals.

An example of the dynamic power combining (DPC) system for DCCS in accordance with another single carrier embodiment is presented in FIG. 5. A first set of power amplifiers 502, 504, 506, 508 receive the broadcast control channel carrier (at amplifiers 502 and 504) and two traffic channel carriers. A summer 518 sums the output of the amplifiers 502 and 504, and a summer 520 sums the output of the amplifiers 506 and 508. A summer 526 sums the output of the summer 518 and 520 and drives the first antenna 530. A second set of power amplifiers 510, 512, 514, 516 receive, respectively, an input from four further traffic channel carriers. A summer 522 sums the outputs of the amplifiers 510 and 512, and a summer 524 sums the output of the amplifiers 514 and 516. A summer 526 sums the output of the amplifiers 522 and 524 and drives a second antenna 532. The summer 518 to 528 may include frequency and combining units.

The DPC system increases the power of signals by using two power amplifiers for the same carrier. The carrier coming from two different transmit branches may be combined coherently (same phase and amplitude) producing one high power signal in the output of the combining unit.

In the example of FIG. 5a, the BCCH carrier forms an input to both power amplifiers 502 and 504, and the outputs of the BCCH carrier are combined. Thus, the coverage layer is enhanced using a 'fixed' DPC system for BCCH carrier (antenna power=1).

The capacity layer (6 carriers in the example) can similarly utilize DPC. That is, if a speech user needs more power than what is available in the capacity layer, the RRM reserves another suitable RTS for the additional power. The RRM then requests that the BTS performs dynamic power combining. The reserved RTSs (for the same signal) are allocated so that they are sent through two different power amplifiers using the same frequency and combining unit. The user then has the same performance as in the coverage layer.

Accordingly, the RRM can reserve an appropriate number of RTSs for a carrier, which is using a data session (GPRS, HSCSD etc). This is illustrated graphically by the power to frequency plot in the example shown in FIG. 5b. A single carrier having a power level of unity (1) 534 is provided in the coverage layer. Six carriers generally represented by 536 having a power level of 0.25 are provided in the capacity layer. The power of some of these carriers may be increased using the techniques described above.

In this example the minimum capacity is 4 carriers with the maximum coverage achieved when all connections are using DPC (CCR4, Table 3) and the maximum capacity is 7 carriers when only the BCCH carrier uses DPC (CCR5). The relative coverage is 1.

Figure 6:
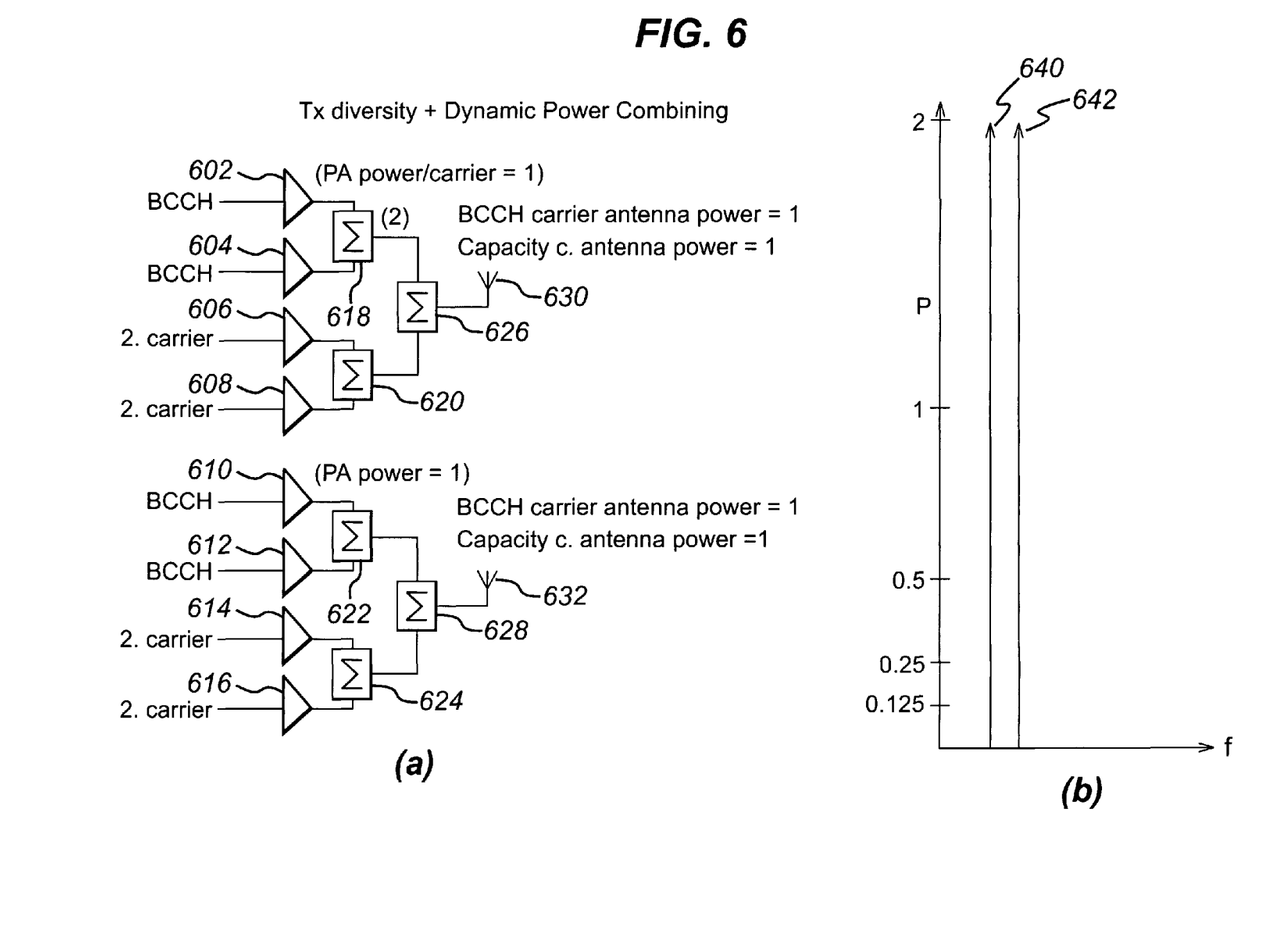
FIG. 6 illustrates an example implementation of power amplifiers in a single carrier system, and a graphical representation of the carrier signals.

All values of the CCR parameters in the Table 3 can be realized using the same BTS configuration (transceivers, combiners, antenna). FIG. 6 described below, shows an ideal coverage solution for the single carrier DCCS. In this example the DDD and DPC are utilized at the same time.

As in the multicarrier system, the power amplifier in the single carrier branch can be dimensioned to have much lower output power than in a conventional single carrier system. For example, in comparison to the invention, in order to simultaneously get relative coverage of 1 and capacity of seven carriers (CCR5) in the conventional system the power amplifiers have to produce 6 dB more output power.

Referring to the example shown in FIG. 6*a*, the BCCH carrier forms an input to power amplifiers 602, 604, 610, 612. A traffic carrier forms an input to power amplifiers 606, 608, 614, 616. The outputs of amplifiers 602, 604 are combined in combiner 618, the outputs of amplifiers 606, 608 are combined in combiner 620, the outputs of amplifiers 610, 612 are combined in combiner 622, the outputs of amplifiers 614, 616 are combined in combiner 624, the outputs of combiners 618, 620 are combined in combiner 626, and the outputs of combiners 622, 624 are combined in combiner 628. The outputs of combiners 626 and 628 drive antennas 630 and 632 respectively.

The combiner 618 may provide DPC for the BCCH carrier, and the combiner 622 may provide DPC for the BCCH carrier in a diversity channel. Similarly the combiner 620 may provide DPC for traffic carrier, and the combiner 628 may provide DPC for the traffic carrier in a diversity channel.

As illustrated in the example of FIG. 6*b*, by utilizing the DDD and DPC techniques in combination, the BCCH carrier 640 and the single traffic carrier 642 each may have a power of 2. FIG. 6 illustrates how the technique may be combined to maximize the power.

The above describes examples of the application of the principles of the invention to multi-carrier systems and single carrier systems.

FIGS. 7 to 10 illustrate different network scenarios for Omni sites in embodiments of the multicarrier system. However, the same techniques may apply for sectored sites and for the single carrier system as well.

Figure 7:
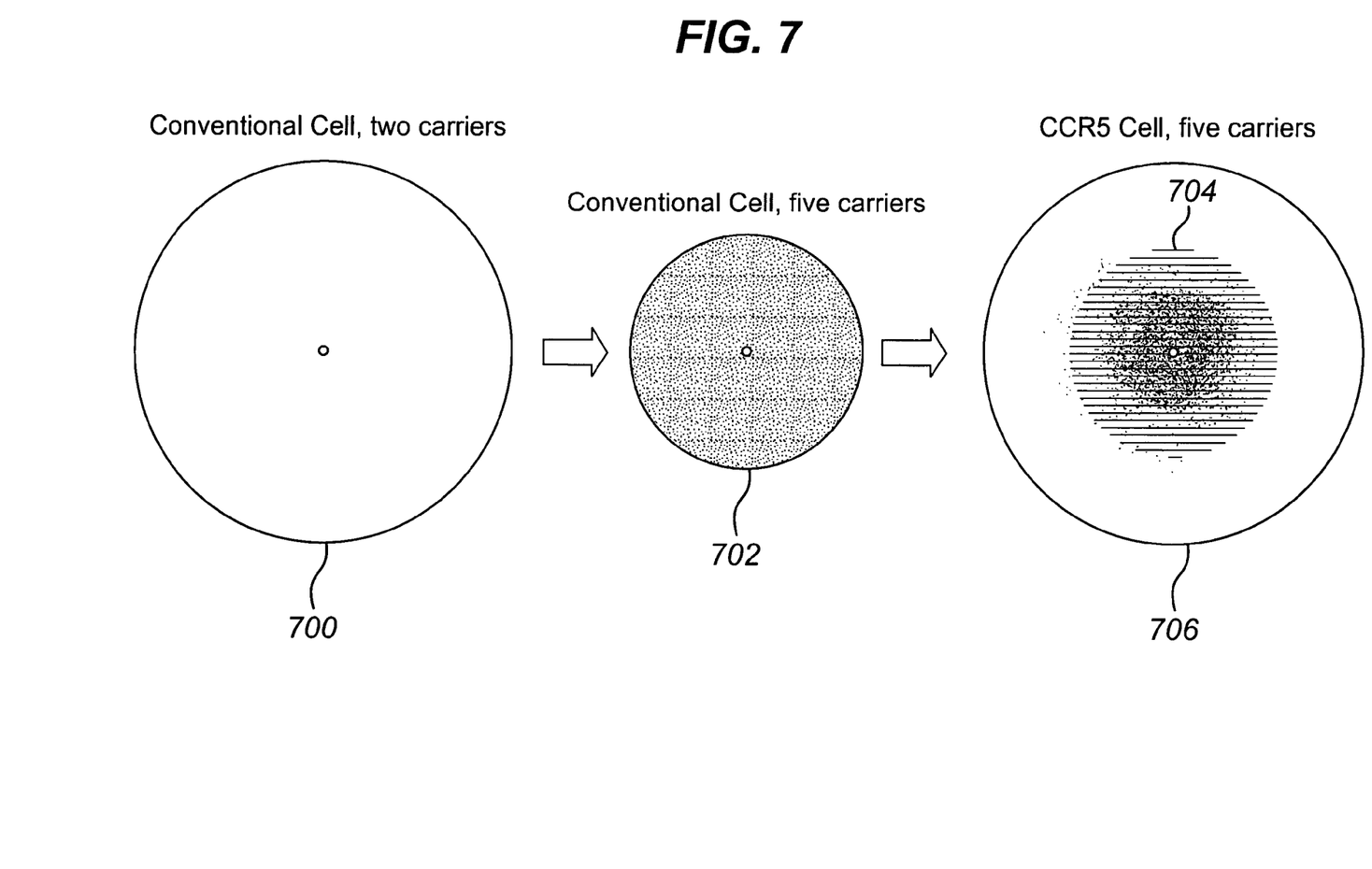
FIGS. 7 to 10 illustrate example cellular architectures associated with embodiments of the invention.

FIG. 7 highlights the single cell case where increasing the carrier number from two to five reduces the cell range by about 25% (4 dB less power per carrier) in a conventional system. The DCCS provides the same coverage as the conventional two-carrier cell, and furthermore, the capacities of 5 carriers only 30% reduction in the range of the capacity layer (4 carriers). Reference numeral 700 denotes a conventional cell with two carriers. Reference numeral 702 denotes a conventional cell with five carriers. In FIG. 7, the drop in coverage area between cells 700 and 702 is shown. Reference numeral 706 denotes the coverage layer of a cell in accordance with the invention, and reference numeral 704 the capacity layer.

Figure 8:
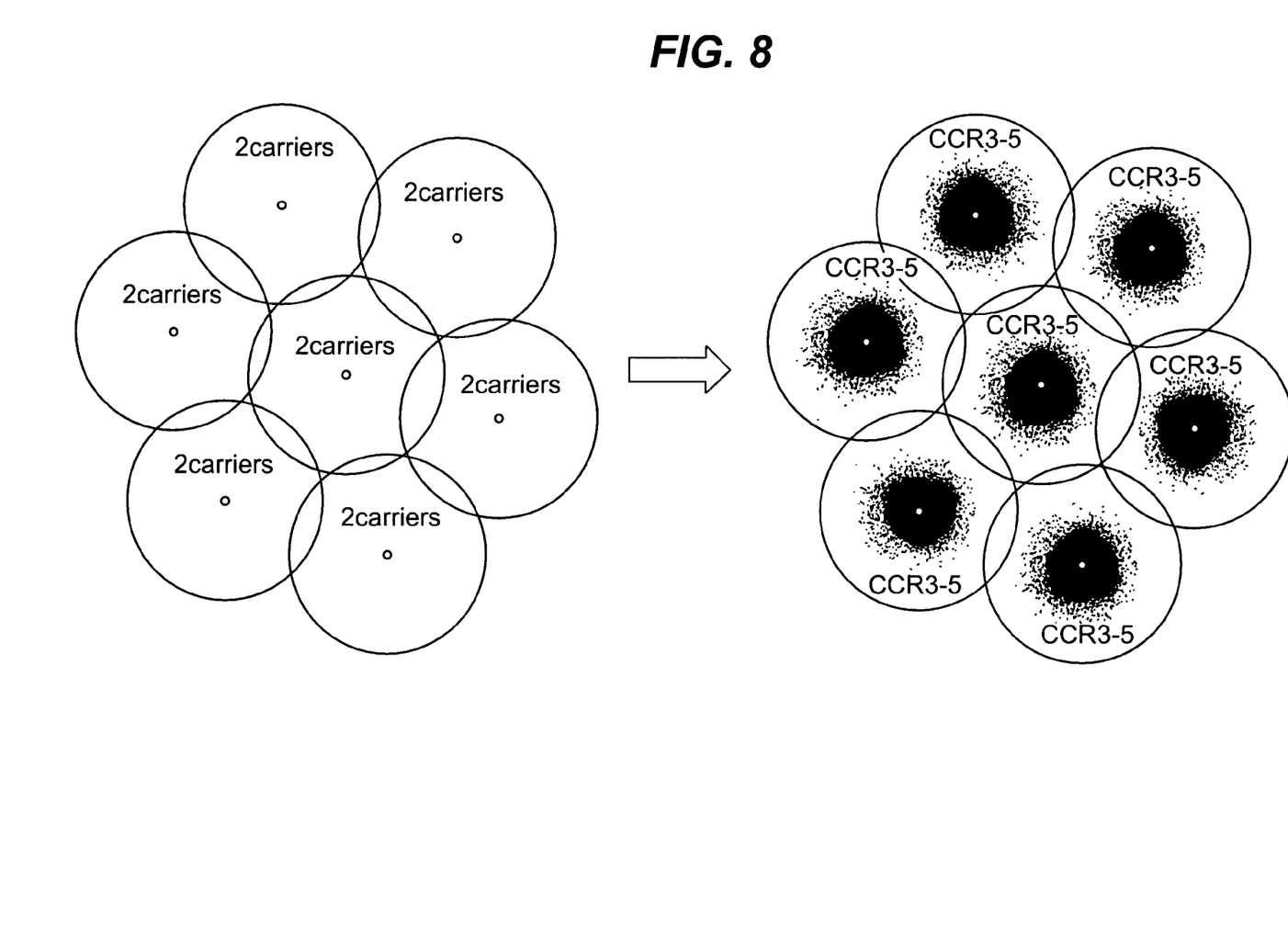

FIG. 8 shows an embodiment of the network where the DCCS provides 50-150% (CCR3-5) more capacity to the area without reduction in the coverage. Typically the cells are overlapping so that there is more capacity available at the cell edges than a single DCCS cell can provide.

FIG. 9 shows an embodiment where the DCCS system is used for dynamic change of the network topology. The capacity of the middle cell 902 is increased and the coverage of the surrounding cells is increased for filling possible coverage holes.

FIG. 10 shows an embodiment where the DCCS system is used for dynamic change of the network topology during 'lazy' hours. The micro cells 950, 952, 954 in the middle of the network area may be 'turned-off', and the coverage holes can be filled with CCR1 cells 960, 962, 964, 966.

Embodiments of the Dynamic Coverage and Capacity Solution in accordance with the invention thus provide an advanced multi-layer macrocell network, while the conventional radio network uses hardware limited macro-, micro and picocells for a multi-layer system. The DCCS provides a controlled cell 'breathing' mechanism for TDMA systems. Adding more capacity to the system does not require any reduction in the cell coverage.

The separation of the coverage and capacity layers also opens the possibility for other separate downlink enhancement methods, which are feasible for different layers. The performance difference of the layers can be reduced by antenna and/or frequency hopping for capacity carriers, using separate antenna combining systems/configurations (e.g. multiantenna system) and linear power amplifiers for different layers, multi timeslot transmission etc.

Intelligent Underlay Overlay (IUO) algorithms may be used for handover procedures and allocating the traffic between the capacity and coverage layers. Also other algorithms may be developed, e.g. based for user power, service (data), C/I ratio etc. A new algorithm may also be provided for allocating the traffic between carriers in the capacity layer. This is especially the case in the single carrier embodiments where some system resources are preferably reserved for DDD/DPC functionality. The development of such algorithms is within the scope of one skilled in the art.

Other characteristics of the invention may include:
i) No needs for standard changes.
ii) DDD gain>3 dB due to diversity.
iii) Dynamic power distribution in the capacity layer improves data properties.
iv) Interference reduction and spectral efficiency.
v) FH, (E)AMR, EDGE as normal The invention, provides a dynamic coverage and capacity solution (DCCS). Thus, the invention provides a new cellular network topology for TDMA (GSM etc) systems utilizing a multicarrier (MC) system, or utilizing a single carrier (SC) system with equivalent properties. For simplification and ease of describing the embodiments of the invention, the radio cell is divided into a 'coverage' layer and a 'capacity' layer. The coverage layer provides a basic coverage and capacity over the whole cell, which may be fixed. The capacity layer is dimensioned to meet the capacity (i.e. number of carriers) and the quality of service (e.g. coverage/data throughput) depending on the requirement of the cellular system. The amount of radio carriers (capacity) and downlink coverage (power, diversity) can be dynamically changed between the carriers and layers depending on the coverage and capacity requirement of the system.

The separation of the coverage and capacity layers according to the invention opens the possibility for separate downlink enhancement methods which are feasible for different layers. Some embodiments of the invention may utilize multiantenna technology (e.g. dynamic downlink diversity) and/or dynamic power combining systems for the different layers, and also carriers within the layers. These technologies may also provide a dynamic coverage and service enhancement for a single carrier system, while the multicarrier system properties are dynamic by nature.

The uplink of a network implementing the invention may function as in a normal cellular radio network, i.e. the uplink covers the whole cell area without limitations, and the uplink capacity may follow the downlink capacity of the system.

The invention effectively optimizes the radio resources of the network leading to a more efficient radio spectrum utilization. Furthermore, the performance of the base transceiver station (BTS) transmitters can be optimized by the invention, which reduces the cost of the hardware. More efficient spectrum utilization and reduced hardware costs result in cheaper radio network deployment.

An embodiment of the invention may dynamically adjust the coverage and capacity of a radio cell provided that the network elements have the required properties. The invention may utilizes a multicarrier system or a single carrier system where performance of the carriers is enhanced in a controlled manner. The invention thus provides a tool for planning and controlling a radio network in different types of coverage and capacity scenarios, realizing that the system does not have to provide all capacity all the time over the whole cell area. In the invention it is assumed that the users are, in general, uniformly distributed over the cell coverage area. The host cell can serve more users near the BTS site, and a service of several cells is available at the cell edge providing adequate capacity over the whole service area.

According to an embodiment of the invention, the traffic carriers do not have to reach the BCCH coverage but the available downlink resources (transmit power, diversity) can be divided between the the BCCH and the traffic carriers in a controlled way by the radio resource management (RRM), allowing dynamic coverage and capacity allocation. In the embodiments of the multicarrier system, the invention divides the available BTS transmit power between a coverage layer (BCCH carrier) and the capacity layer (traffic carriers) in a controlled way. Accordingly, in the embodiments of the single carrier system, the available downlink enhancement features (e.g. diversity and power combining) may be utilized between the coverage layer and capacity layer in a controlled way. The invention may include the following:

i) Sophisticated capacity and coverage layer control provides the same network performance with less resources. This feature leads to a cheaper radio network, no waste of resources, and efficient spectrum utilization.

ii) BTS transmitters and antenna combining systems do not have to be designed to provide the same high power for all carriers. This leads to cheaper hardware design, smaller size, less heat dissipation etc.

iii) The radio network coverage and capacity pattern (topology) are easier to change and they can be changed dynamically. The RRM can, for example, adjust the radio network dynamically in a way such that during the busy hour the hot spots have more channel capacity provided by smaller cells and surrounding areas have less capacity but high radio power cells to fill in the coverage demand.

iv) Adding more capacity to the system does not mean reduction in the cell coverage any more. Coverage reduction in the high capacity cell is small if the capacity is dynamically controlled by RRM in the proposed way.

v) Some cells/sites may be even shut down during the times with less traffic without reduction in the network service.

vi) Reduces the total transmit power throughout the network, reducing radio interference. This leads to more efficient spectrum utilization.

Embodiments of the invention may include at least one of the following features of the invention. For example, a power level of a carrier in the downlink of the coverage layer defines the coverage of the cell. The power level is variable.

The number of carriers in the capacity layer may be variable. The power level of any carrier in the capacity layer may be variable.

A total transmission power for the downlink is divided between the coverage and capacity cellular layers. The power available for each of the coverage and capacity layers is divided between the carriers in the respective layers.

The system may be a multi-carrier system or a single carrier system.

A power level of a carrier in the coverage layer defines the coverage of the cell. The power level is variable.

The number of carriers in the capacity layer is variable. The power level of any carrier in the capacity layer is variable.

There is provided a total available power for the downlink. The power is divided between the coverage and capacity layers.

The addition of a carrier in the capacity layer may include selectively reducing the power of one or more carriers in the capacity layer.

A connection using a carrier in the capacity layer may be transferred to a carrier in the coverage layer to increase coverage for the connection.

A connection using a carrier in the coverage layer may be transferred to a carrier in the capacity layer to increase capacity of the cell.

The power levels of the variable numbers of carriers is in dependence on the proximity of a mobile station associated with a carrier to the base station.

The total power of the variable number of carriers may be predetermined. The share of the predetermined power amongst the variable number of carriers is determined by the total number of the carriers.

The device for transmitting a variable number of users may be adapted to reduce the power allocated to one or more carriers responsive to an increase in the number of carriers.

The invention has been described herein by way of example, with reference to preferable embodiments. The invention is not limited to such embodiments, nor to any aspects thereof. The scope of protection is defined by the appended claims.

The invention claimed is:

1. An apparatus comprising:
a defining unit configured to define a capacity layer for a cell of a communications system, the cell comprising a coverage layer having a fixed coverage area provided by at least one carrier, the capacity layer comprising at least one carrier, each carrier in the capacity layer having a dynamically variable coverage area, wherein the defining unit is configured to vary the number of carriers in the capacity layer to dynamically vary a total number of carriers in the cell,
wherein a power level of the at least one carrier in the capacity layer is variable such that the power level of the at least one carrier can be varied in dependence upon a distance of an associated mobile station from the base station,
wherein a total transmission power for a downlink is divided between the coverage layer and the capacity layer of said cell in dependence on the coverage and capacity requirement of the system, and
wherein the power level of the at least one carrier is adjusted without adjusting the total transmission power.

2. An apparatus according to claim 1, wherein power available for at least one of the coverage layer and the capacity layer is divided between carriers in the coverage layer and the capacity layer.

3. An apparatus according to claim 1, wherein the said power level is variable in dependence on a position of a mobile station.

4. A method comprising:
defining, by a station, a capacity layer for a cell of a communications system, the cell comprising a coverage layer having a fixed coverage area provided by at least one carrier, the capacity layer comprising at least one carrier, each carrier in the capacity layer having a dynamically variable coverage area;
varying, by the station, the number of carriers in the capacity layer to dynamically vary a total number of carriers in the cell, wherein a power level of the at least one carrier in the capacity layer is variable such that the power level of the at least one carrier can be varied in dependence upon a distance of an associated mobile station from the base station;

dividing a total available power for a downlink between the coverage layer and the capacity layer in dependence on the coverage and capacity requirement of the system; and adjusting the power level of the at least one carrier without adjusting the total available power.

5. A method according to claim 4, wherein the providing further comprises providing at least one carrier of said at least one carrier in the capacity layer having a power level in the capacity layer which is variable.

6. A method according to claim 5, further comprising varying the power level of a carrier in the capacity layer in dependence on a position of a mobile station.

7. A method according to claim 4, further comprising:
adding a carrier in the capacity layer, the adding including selectively reducing a power of at least one carrier in the capacity layer.

8. A method according to claim 4, further comprising:
transferring a connection using a carrier in the capacity layer to a carrier in the coverage layer to increase coverage for said connection.

9. A method according to claim 4, further comprising:
transferring a connection using a carrier in the coverage layer to a carrier in the capacity layer to increase capacity of the cell.

10. An apparatus comprising:
at least one transmitter configured to transmit a first carrier at a predetermined power level thereby defining a fixed coverage area of a cell of a communications system, and further configured to transmit a variable number of further carriers to define, at least in part, a dynamically variable total number of carriers in the cell, wherein each of the further carriers has a dynamically variable coverage area,
wherein power levels of the further carriers depend upon a proximity of a mobile station associated with a carrier to a base station,
wherein a total power of the further carriers comprises a predetermined power, and
wherein a portion of said predetermined power among the further carriers is determined by a total number of carriers.

11. An apparatus according to claim 10, wherein the at least one transmitter is further configured to reduce power allocated to at least one carrier in response to an increase in the number of further carriers.

12. An apparatus comprising:
defining means for defining a capacity layer for a cell of a communications system, the cell comprising a coverage layer having a fixed coverage area provided by at least one carrier, the capacity layer comprising at least one carrier, each carrier in the capacity layer having a dynamically variable coverage area; and means for varying the number of carriers in the capacity layer to dynamically vary a total number of carriers in the cell, wherein a power level of the at least one carrier in the capacity layer is variable such that the power level of the at least one carrier can be varied in dependence upon a distance of an associated mobile station from the base station;

means for dividing a total available power for a downlink between the coverage layer and the capacity layer in dependence on the coverage and capacity requirement of the system; and means for adjusting the power level of the at least one carrier without adjusting the total available power.

13. An apparatus comprising:
first carrier transmitting means for transmitting a first carrier at a predetermined power level thereby defining a fixed coverage area of a cell of a communications system, and
variable number transmitting means for transmitting a variable number of further carriers to define, at least in part, a dynamically variable total number of carriers in the cell, wherein each of the further carriers has a dynamically variable coverage area,
wherein power levels of the further carriers depend upon a proximity of a mobile station associated with a carrier to a base station,
wherein a total power of the further carriers comprises a predetermined power, and
wherein a portion of said predetermined power among the further carriers is determined by a total number of carriers.

14. A cellular communication system including at least one cell, said cell comprising:
a station configured to
provide a coverage layer having a fixed coverage area,
provide a capacity layer comprising at least one carrier, said at least one carrier having a dynamically variable coverage area, and
vary the number of carriers in the capacity layer to dynamically vary the total number of carriers in the cell,
wherein a power level of the at least one carrier in the capacity layer is variable such that the power level of the at least one carrier can be varied in dependence upon a distance of an associated mobile station from the base station,
wherein a total transmission power for a downlink is divided between the coverage layer and the capacity layer of said cell in dependence on the coverage and capacity requirement of the system, and
wherein the power level of the at least one carrier is adjusted without adjusting the total transmission power.

* * * * *